United States Patent
Ahmadi et al.

(10) Patent No.: US 11,005,227 B2
(45) Date of Patent: May 11, 2021

(54) MULTI-WAVELENGTH ADJUSTABLE-RADIAL-MODE FIBER LASER

(71) Applicant: Nufern, East Granby, CT (US)

(72) Inventors: Peyman Ahmadi, Manchester, CT (US); Peter Andrew Rosenthal, West Simsbury, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 16/562,365

(22) Filed: Sep. 5, 2019

(65) Prior Publication Data

US 2021/0075181 A1  Mar. 11, 2021

(51) Int. Cl.
*H01S 3/067* (2006.01)
*B23K 26/06* (2014.01)
*H01S 3/10* (2006.01)
*H01S 3/109* (2006.01)
*H01S 3/23* (2006.01)

(52) U.S. Cl.
CPC ...... *H01S 3/06729* (2013.01); *B23K 26/0626* (2013.01); *H01S 3/109* (2013.01); *H01S 3/10061* (2013.01); *H01S 3/10084* (2013.01); *H01S 3/2308* (2013.01)

(58) Field of Classification Search
CPC .. H01S 3/06729; H01S 3/10061; H01S 3/109; H01S 3/10084–10092; H01S 3/2308–235; B23K 26/0626
See application file for complete search history.

(56) References Cited

U.S. PATENT DOCUMENTS

| 6,049,415 | A |  | 4/2000 | Grubb et al. |
| 6,676,402 | B1 | * | 1/2004 | Early .................. F02P 23/04 123/143 B |
| 7,920,616 | B2 | * | 4/2011 | Brown ................. H01S 3/0057 372/55 |

(Continued)

FOREIGN PATENT DOCUMENTS

| EP | 1284672 B1 | 12/2006 |
| WO | 2009/077636 A1 | 6/2009 |

(Continued)

OTHER PUBLICATIONS

Guintrand et al., "Stimulated Brillouin scattering threshold variations due to bend-induced birefringence in a non-polarization-maintaining fiber amplifier" Retrieved on Feb. 25, 2020, 2 pages.

(Continued)

*Primary Examiner* — Xinning(Tom) Niu
(74) *Attorney, Agent, or Firm* — Morrison & Foerster LLP (57) ABSTRACT

A high-power fiber laser produces a compound output beam having a center beam and an annular beam. The center beam and the annular beam are independently adjustable in power and wavelength. The output beam is delivered from an output optical fiber having a center core and a concentric annular core. A fundamental beam generated by a seed laser is amplified by a fiber amplifier and partially converted to a second-harmonic beam by a second-harmonic generator. The residual fundamental beam and second-harmonic beam are separated, attenuated, and selectively coupled into the cores of the output optical fiber.

20 Claims, 4 Drawing Sheets

(56) References Cited

U.S. PATENT DOCUMENTS

| | | |
|---|---|---|
| 2005/0226287 A1 | 10/2005 | Shah et al. |
| 2007/0133086 A1* | 6/2007 | Wilhelm ................ G02B 21/16 359/385 |
| 2008/0114254 A1 | 5/2008 | Matcovitch et al. |
| 2009/0103576 A1* | 4/2009 | Achtenhagen ........ H01S 3/2308 372/22 |
| 2009/0245301 A1 | 10/2009 | Peng et al. |
| 2017/0361405 A1 | 12/2017 | Renz et al. |
| 2018/0088343 A1 | 3/2018 | Kliner et al. |
| 2019/0006817 A1 | 1/2019 | Onose et al. |

FOREIGN PATENT DOCUMENTS

| | | |
|---|---|---|
| WO | 2016/062914 A1 | 4/2016 |
| WO | 2018/104575 A1 | 6/2018 |
| WO | 2019/129917 A1 | 7/2019 |

OTHER PUBLICATIONS

Hess et al. "Continuous Wave Laser Welding of Copper with Combined Beams at Wavelengths of 1030 nm and of 515 nm" Physics Procedia, vol. 12, 2011, pp. 88-94.
International Search Report and written Opinion received for PCT Patent Application No. PCT/US2020/045661, dated Dec. 1, 2020, 14 pages.

* cited by examiner

MULTI-WAVELENGTH ADJUSTABLE-RADIAL-MODE FIBER LASER

TECHNICAL FIELD OF THE INVENTION

The present invention relates in general to fiber laser resonators and amplifiers. The invention relates in particular to high-power fiber lasers delivering a laser beam having an adjustable radial mode.

DISCUSSION OF BACKGROUND ART

Beams of laser radiation are increasingly used for cutting, drilling, marking, and scribing workpieces made of a wide range of materials; including metals, glasses, and polymers. Traditional mechanical processing produces unwanted defects, such as micro-cracks that may propagate when a processed workpiece is stressed, thereby degrading and weakening the processed workpiece. Laser processing minimizes such unwanted defects, is generally cleaner, and causes a smaller heat-affected zone. Laser processing uses a focused laser beam to produce precise cuts and holes, having high-quality edges and walls, while minimizing the formation of unwanted defects. In laser welding, a focused laser beam locates each weld spot or seam precisely and produces uniform welds with minimal collateral heating.

Fiber lasers are used extensively in industrial laser-processing applications that require both high power and high beam quality. For example, in laser cutting and laser welding of metals and metal alloys. In a fiber laser, the gain medium is an optical fiber having a core that is doped with an optically-active ion, such as neodymium ($Nd^{3+}$) or ytterbium ($Yb^{3+}$). A laser beam at an emission wavelength of the optically active ion is amplified and guided within the core. Neodymium and ytterbium ions have emission wavelengths in the near-infrared region of the electromagnetic spectrum, between about 950 nanometers (nm) and 1100 nm. The core is typically energized with shorter-wavelength pump radiation provided by a plurality of diode lasers. Diode lasers efficiently convert electrical power into optical power that can be directed into a gain fiber.

Near-infrared laser beams are absorbed by many, but not all, common industrial materials targeted for laser processing. For example, steel alloys are strongly absorbing at near-infrared wavelengths. In contrast, the absorption of copper is about an order-of-magnitude lower. This low absorption, combined with a relatively-high thermal conductivity, makes copper and copper alloys difficult to weld using near-infrared laser beams. By way of example, key hole seam welding of copper is prone to spatter and irregularities in the finished seam. Tight control of the material composition and laser processing parameters is required to produce uniform seams having acceptable quality.

Copper is much more absorbing at shorter wavelengths and has absorption that is comparable to steel below about 500 nm. Therefore, less power is required to melt and weld copper using lasers having visible wavelengths and the quality of welds is improved. A near-infrared laser beam may be converted to a visible laser beam by harmonic generation in an optically nonlinear crystal. Using the example above, a near-infrared "fundamental" beam having a wavelength between 950 nm and 1100 nm would be partially converted to a second-harmonic beam having a corresponding visible wavelength between 475 nm and 550 nm. Additional power is required in the fundamental beam to overcome losses in second harmonic generation, which has until now limited the power of visible wavelength lasers and therefore limited the adoption of visible wavelength lasers for copper welding.

There is need for a fiber laser source providing sufficient power to process workpieces made of copper, bronze, other copper alloys, and other materials having higher absorption at shorter wavelengths than the fundamental wavelengths of traditional fiber lasers. Preferably, the fiber laser source would be power scalable to enable high-quality and rapid processing of thick workpieces made of these materials.

SUMMARY OF THE INVENTION

In one aspect, a fiber laser in accordance with the present invention comprises a seed laser providing a laser beam having a fundamental wavelength and a fiber amplifier arranged to receive and amplify the fundamental beam. The amplified fundamental beam is linearly polarized. A harmonic generator is arranged to receive the amplified fundamental beam and partially convert the amplified fundamental beam into a laser beam having a harmonic wavelength corresponding to a harmonic of the fundamental wavelength. The partial conversion leaves a residual laser beam having the fundamental wavelength. A dichroic mirror is arranged to intercept and spatially separate the residual fundamental beam and the harmonic beam. A first polarization modulator and a first polarizer are arranged to receive the residual fundamental beam and to regulate power by passing at least portion thereof. A second polarization modulator and a second polarizer are arranged to receive the harmonic beam and to regulate power by passing at least a portion thereof. An output optical fiber is provided having a center core and an annular core. A fiber combiner is arranged to receive the regulated fundamental beam and the regulated harmonic beam. The fiber combiner is configured to couple at least a portion of the regulated fundamental beam into a first one of the cores of the output optical fiber and to couple at least a portion of the regulated harmonic beam into a second one of the cores of the output optical fiber.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
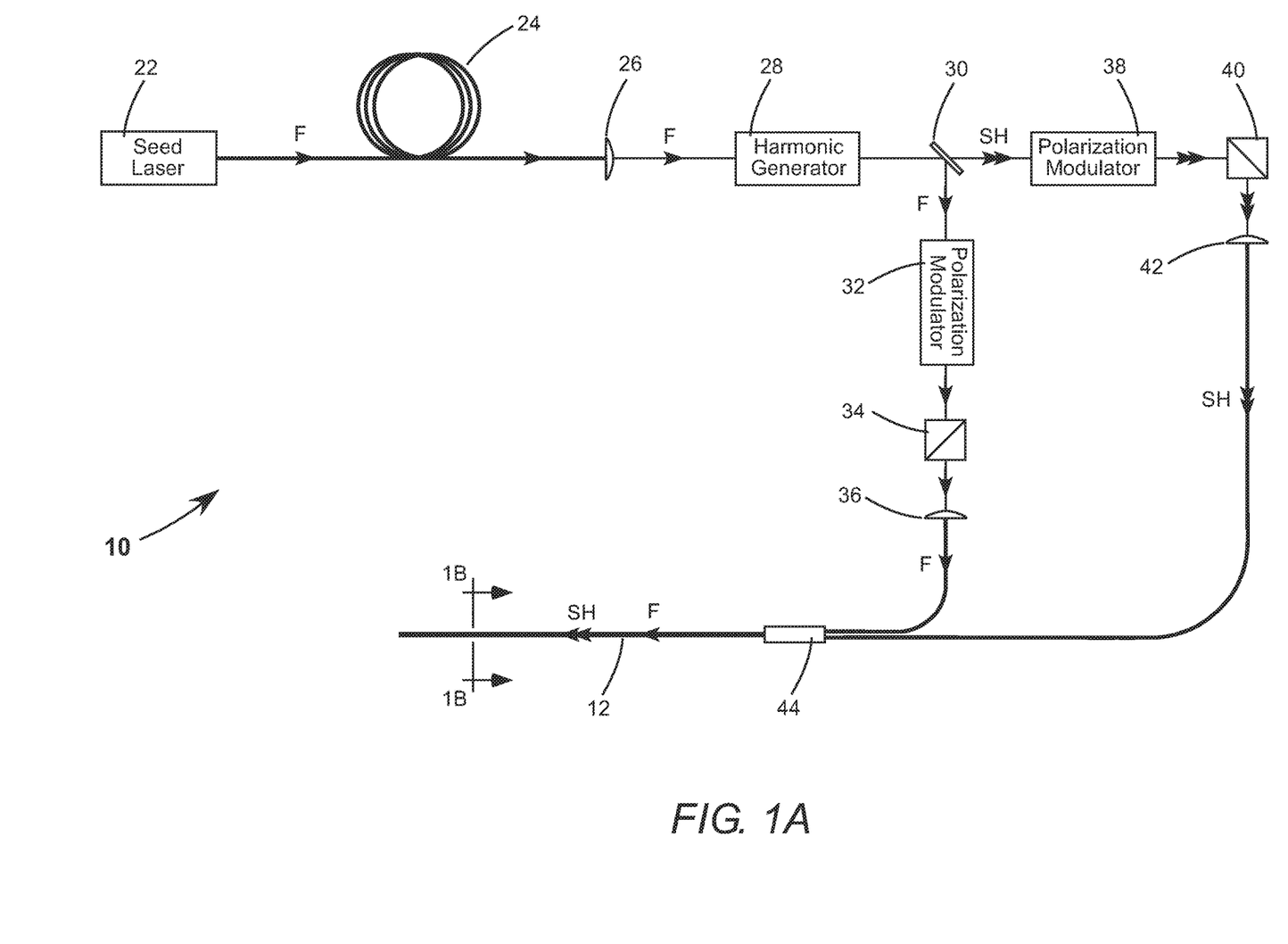
FIG. 1A schematically illustrates one preferred embodiment of a fiber laser in accordance with the present invention, including a seed laser, a fiber amplifier made of polarization-maintaining optical fiber, a harmonic generator, a dichroic mirror for separating a fundamental beam and a second-harmonic beam, a fiber combiner, and an output optical fiber.
Figure 1B:
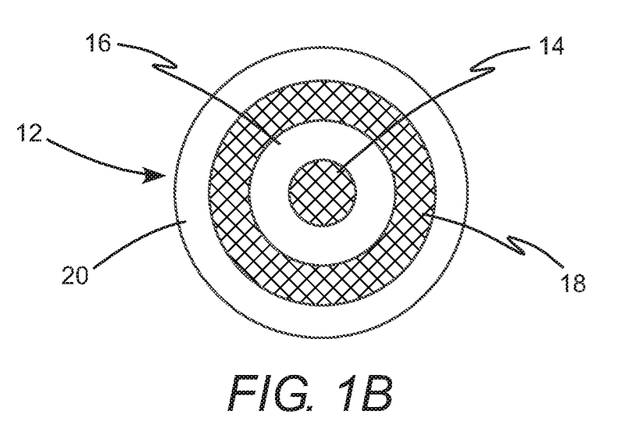
FIG. 1B is a cross-sectional view schematically illustrating details of the output optical fiber of FIG. 1A, which has a center core and an annular core, the fiber laser of FIG. 1A arranged to selectively couple the fundamental beam into one core and the second-harmonic beam into the other core.

Referring now to the drawings, wherein like components are designated by like numerals, FIGS. 1A and 1B schematically illustrate one preferred embodiment of a fiber laser 10 in accordance with the present invention. Fiber laser 10 delivers at least two beams of laser radiation through an output optical fiber 12. Output optical fiber 12 includes a center core 14 for guiding a center beam of laser radiation. Center core 14 has a low refractive index cladding 16. Output optical fiber 12 further includes an annular core 18 for guiding an annular beam of laser radiation. Annular core 18 is concentrically located between low refractive index cladding 16 and a low refractive index cladding 20.

A seed laser 22 provides a laser beam having a fundamental wavelength. The fundamental beam is indicated in FIG. 1A by single-headed arrows F. Fundamental beam F may be continuous wave (CW) or pulsed. Welding applications most-often use CW laser beams and CW operation is assumed herein for convenience of description. However, the inventive fiber laser also works for pulsed laser beams. Ultrafast pulsed laser beams having ultrashort pulse durations of less than about 100 picoseconds may be produced by mode-locking. Pulsed laser beams having pulse durations longer than about 1 nanosecond may be produced by Q-switching.

Seed laser 22 includes a laser resonator and may additionally include one or more preamplifiers. The laser resonator may be a diode laser, such as a distributed feedback diode, or a fiber laser having an optical resonator defined by fiber Bragg gratings. The preamplifiers may conveniently be fiber amplifiers that sequentially increase the average power of fundamental beam F. A phase modulator may also be included in seed laser 22 to spectrally broaden fundamental beam F, which increases the thresholds for some non-linear processes during amplification in an optical fiber, and in particular increases the threshold for stimulated Brillouin scattering (SBS).

A fiber amplifier 24 is arranged to receive and amplify fundamental beam F. Fiber amplifier 24 is energized by pump radiation that is generated by a plurality of diode lasers and delivered through pump combiners (not shown). For high-power operation, the preamplifiers and the fiber amplifier would be made of double-clad gain fibers, having a core that guides fundamental beam F and a cladding that guides the pump radiation. Amplified fundamental beam F is preferably linearly polarized to enable subsequent harmonic conversion. Amplified fundamental beam F is transferred from fiber-guided to free-space propagation by a fiber collimator 26 and directed thereby into a harmonic generator 28.

Harmonic generator 28 includes at least one optically nonlinear element arranged to partially convert amplified fundamental beam F into a laser beam having a wavelength corresponding to a harmonic of fundamental wavelength. A second-harmonic beam or a third-harmonic beam, for example. Generation of third-harmonic and higher-harmonic wavelengths generally requires more than one optically nonlinear element. An optically non-linear element could be an oriented crystal or a periodically-polled material. Harmonic generator 28 may further include lenses that focus amplified fundamental beam F and collimate the harmonic beam.

Here, second-harmonic generation will be assumed and the second-harmonic beam is indicated by double-headed arrows SH. The second-harmonic wavelength is half the fundamental wavelength. The partial conversion leaves a residual beam of unconverted fundamental laser radiation. Harmonic generation is a polarization-dependent process, so the residual fundamental beam and the second-harmonic beam will be polarized.

Internal structures of seed laser 22, fiber amplifier 24, and harmonic generator 28 have been omitted from the drawings for clarity of illustration. Those skilled in the art of laser engineering would be familiar with construction of such devices. Further description thereof is not necessary for understanding the principles of the present invention.

A dichroic mirror 30 is arranged to intercept and spatially separate residual fundamental beam F and second-harmonic beam SH. In the arrangement depicted, mirror 30 reflects residual fundamental beam F and transmits second-harmonic beam SH. Residual fundamental beam F then propagates through a polarization modulator 32, a polarizer 34, and a fiber coupler 36. Together, polarization modulator 32 and polarizer 34 attenuate the power of residual fundamental beam F. Similarly, second-harmonic beam SH propagates through a polarization modulator 38, a polarizer 40, and a fiber coupler 42. Together, polarization modulator 38 and polarizer 40 attenuate the power of second-harmonic beam SH.

One common type of polarization modulator is a Pockels cell, which uses the electro-optic effect by applying a large electric potential across at least one optically nonlinear crystal. An analogue or digital control signal regulates the electric potential and thereby regulates the net polarization change as a beam transits therethrough. A simpler polarization modulator is an adjustable half-wave plate, which is sufficient for laser-processing applications that do not require rapid changes in power. Polarizers 34 and 40 are depicted as cube-prism polarizers, having an internal polarization-selective surface. Each polarizer passes a portion of the beam that has a selected polarization and rejects the complementary portion having the orthogonal polarization. The portion of the beam passed by the polarizer is transferred from free-space back into fiber-guided propagation by the fiber coupler. The portion of each beam that is passed in this arrangement may be independently regulated between about 100% and about 0%.

Regulated fundamental beam F and regulated second-harmonic beam SH are guided into a fiber combiner 44 and thereby into output optical fiber 12. Fiber combiner 44 is configured to couple these beams into center core 14 and annular core 18 as required by the material-processing application. For example, some applications may require a center beam having the second-harmonic wavelength only and an annular beam having the fundamental wavelength only. Conversely, other applications may require a center beam having the fundamental wavelength only and an annular beam having the second-harmonic wavelength only. Suitable fiber combiners are described in international patent applications PCT/FI2007/050690 and PCT/FI2014/050790, each of which is incorporated herein by reference.

Figure 2:
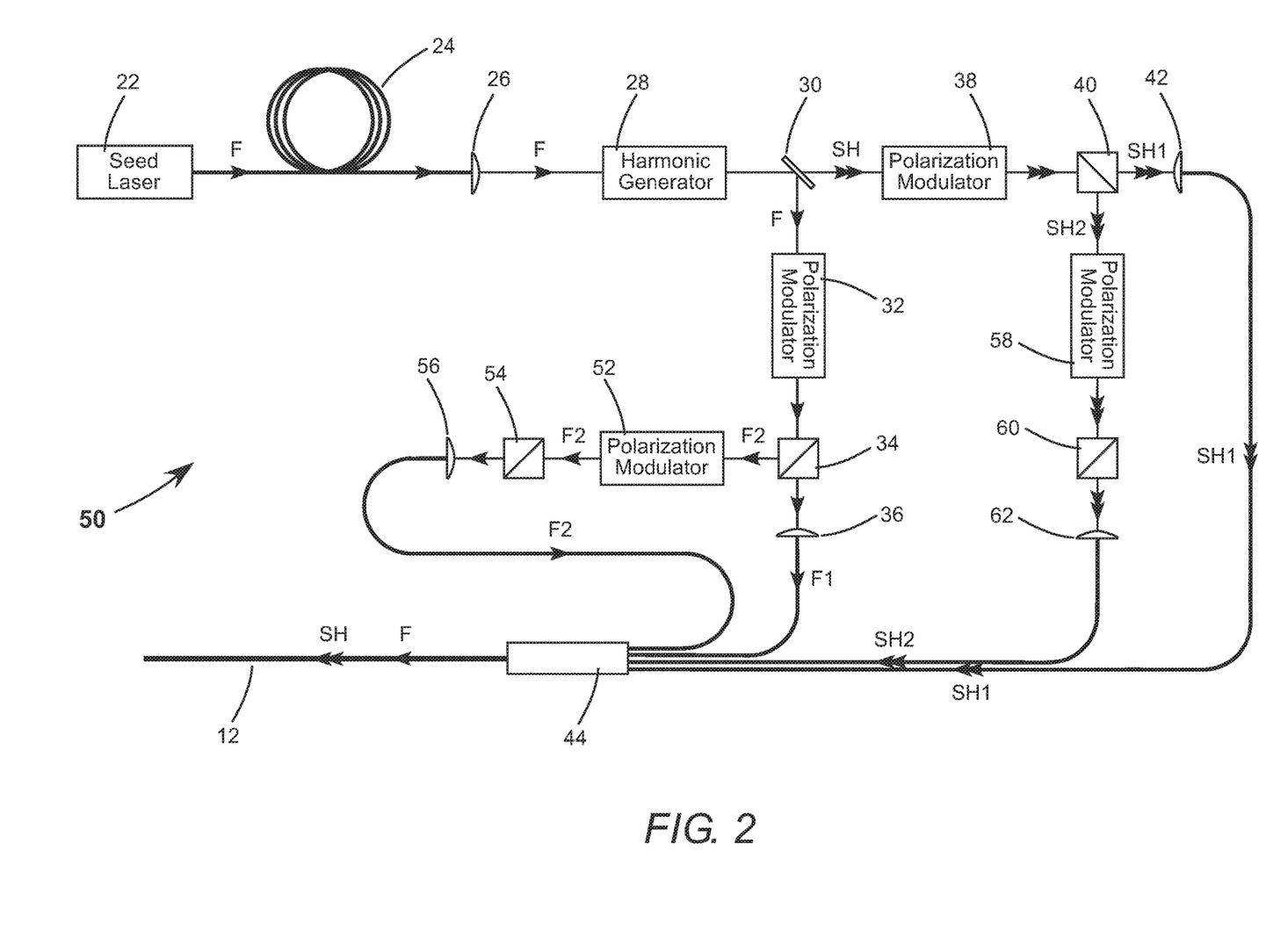
FIG. 2 schematically illustrates another preferred embodiment of a fiber laser in accordance with the present invention, similar to the embodiment of FIG. 1A, but arranged to selectively couple the fundamental beam and the second-harmonic beam into both cores of the output optical fiber.

In yet other applications, some combination of the fundamental wavelength and the second-harmonic wavelength may be required in one or both cores of output optical fiber 12. FIG. 2 schematically illustrates another preferred embodiment of a fiber laser 50 in accordance with the present invention. Fiber laser 50 is similar to fiber laser 10, but enables mixing of residual fundamental beam F and second-harmonic beam SH in each core of output optical fiber 12. A simplest arrangement would couple the rejected portions of these beams back into optical fiber and therethrough into fiber combiner 44. The arrangement depicted in FIG. 2 has additional polarization modulators and polarizers to further control the mixing and power of each wavelength in the two cores of output optical fiber 12.

In fiber laser 50, one portion of residual fundamental beam F passed through polarizer 34 becomes fundamental beam F1 and the complementary portion becomes fundamental beam F2. A polarization modulator 52 and a polarizer 54 together regulate fundamental beam F2, which is then transferred into optical fiber by fiber coupler 56. Similarly, one portion of second-harmonic beam SH passed through polarizer 40 becomes second-harmonic beam SH1 and the complementary portion becomes second-harmonic beam SH2. A polarization modulator 58 and a polarizer 60 together regulate second-harmonic beam SH2, which is then transferred into optical fiber by fiber coupler 62. In the arrangement depicted, fundamental beam F1 and second-harmonic beam SH2 are coupled into center core 14, while fundamental beam F2 and second-harmonic beam SH1 are coupled into annular core 18. Polarization modulators 32, 38, 52, and 58 can be adjusted to achieve a desired mixing of power in the fundamental wavelength and power the second-harmonic wavelength in each core of output optical fiber 12. Continuous tuning of the relative power of each wavelength in each core is possible. These polarization modulators also enable time-dependent power control of each wavelength in each core.

The second-harmonic generation in harmonic generator 28 is a polarization-dependent process. Therefore, for efficient operation, fiber amplifier 24 in fiber lasers 10 and 50 could be made of polarization-maintaining optical fiber to produce a linearly polarized fundamental beam F. Stress rods incorporated into polarization-maintaining optical fiber provide polarization-selective linear birefringence. However, even in nominally single-mode optical fiber, these stress rods enhance the electric fields of high-order modes close to the core and ultimately limit the power scaling possible in polarization-maintaining optical fiber. The inventors have found that approximately 1.5 kilowatts (kW) is a practical limit for amplification of a polarized single-mode beam.

Figure 3:
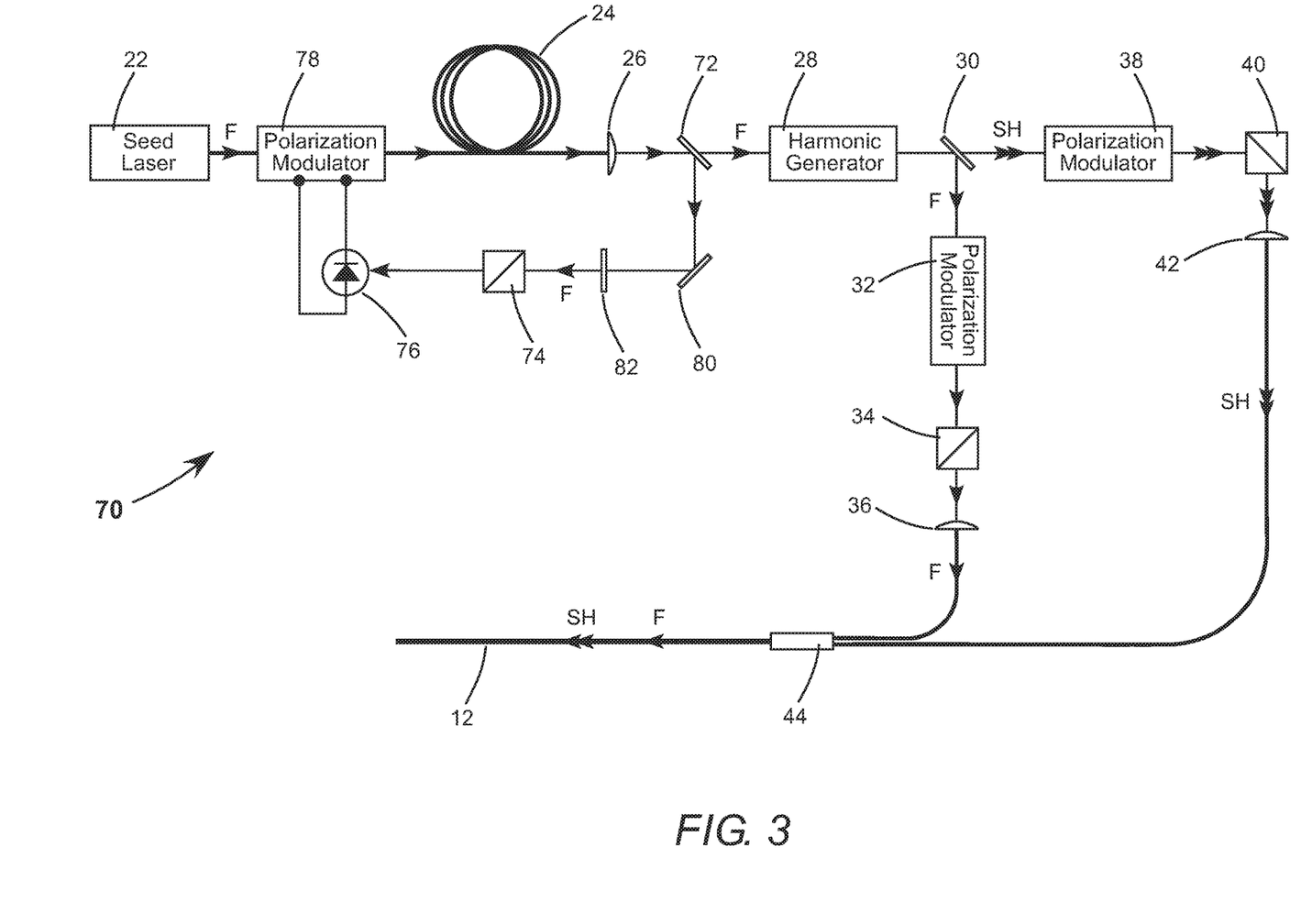
FIG. 3 schematically illustrates yet another preferred embodiment of a fiber laser in accordance with the present invention, similar to the embodiment of FIG. 1A, but having a fiber amplifier made without polarization-maintaining optical fiber and including an additional polarization modulator located between the seed laser and the fiber amplifier.

FIG. 3 schematically illustrates yet another preferred embodiment of a fiber laser 70 in accordance with the present invention, similar to fiber laser 10, but fiber amplifier 24 is made without polarization-maintaining optical fiber. This enables generation of a higher-power fundamental beam F and therefore enables power scaling of the beams in output optical fiber 12. However, fundamental beam F must still have a well-defined linear polarization that is correctly oriented with respect to the optically non-linear elements in harmonic generator 28 for efficient harmonic generation.

Fiber laser 70 includes a partially-reflective mirror 72 located between fiber amplifier 24 and harmonic generator 28. Mirror 72 picks off a small fraction of amplified fundamental beam F to be directed onto a polarizer 74. A portion of the directed fundamental beam having a selected polarization is passed by polarizer 74 and propagates onto a photodetector 76. Photodetector 76 is represented symbolically in the drawing as a photodiode. Mirror 72, polarizer 74, and photodetector 76 collectively sample and analyze the polarization of amplified fundamental beam F. Photodetector 76 is electrically connected to a polarization modulator 78 located between seed laser 22 and fiber amplifier 24. The electrical signal from photodetector 76 is conditioned into a control signal that regulates a change in polarization as fundamental beam F transits through polarization modulator 78. Polarization modulator 78 thereby compensates for any polarization changes as fundamental beam F transits through fiber amplifier 24. Polarization modulator 78 establishes and maintains a desired linear polarization of amplified fundamental beam F. A polarization extinction ratio greater than 17 decibels (dB) can be achieved with this arrangement.

A simple partially-reflective mirror is a wedge made of glass, with one Fresnel reflection directed onto polarizer 74. If mirror 72 has polarization-selective reflectivity, polarizer 74 can be omitted from fiber laser 70. Polarization selective reflection can be achieved through careful design and fabrication of thin-film optical coatings on the surfaces of mirror 72. Another optional mirror 80 is included in the arrangement depicted, to intercept and redirect the small fraction of amplified fundamental beam F reflected by mirror 72. An optional half-wave plate 82 is also depicted. If mirrors 72 and 80 are unpolarized, half-wave plate 82 may be adjusted to select a polarization orientation of amplified fundamental beam F. Half-wave plate 82 eliminates need to mechanically orient polarizer 74 with respect to harmonic generator 28. It should be noted that the same elements and principles could be applied to make a fiber laser having a fiber amplifier made without polarization-maintaining optical fiber that is similar to fiber laser 50.

By way of example, seed laser 22 provides a beam having a near-infrared fundamental wavelength of about 1064 nm. Fiber amplifier 24 has a core made of ytterbium doped silica glass to amplify this fundamental wavelength. The second-harmonic beam would have a corresponding green second-harmonic wavelength of about 532 nm. An amplified single-mode CW fundamental beam can be converted to a second-harmonic beam at greater than 50% efficiency in a crystal of lithium triborate (LBO), producing greater than 1000 watts (W) of second-harmonic power and leaving greater than 1000 W of residual fundamental power. The second-harmonic beam has a beam-quality factor ($M^2$) that is less than about 1.3 and may be less than 1.1. The residual fundamental beam has a beam-quality that is less than about 1.5 and may be less than 1.2.

To weld workpieces made of copper, the inventive fiber laser would be configured to provide a core beam that is predominantly the near-infrared fundamental wavelength and an annular beam that is predominantly the green second-harmonic wavelength. These beams emerge from output optical fiber 12 and are focused onto the workpieces being welded. The focused beams have a transverse intensity distribution with a near-infrared focused center beam that is surrounded by a green focused annular beam.

During welding, the green focused annular beam is absorbed by the workpieces and preheats the irradiated surfaces of the workpieces. The preheated workpieces, in turn, absorb the near-infrared focused center beam. It is known that for copper around 1300 kelvin (K), which is around 1000 degrees Celsius (° C.), there are abrupt changes in both thermal conductivity and 1 micrometer (μm) optical absorption. Heating copper through this temperature reduces the thermal conductivity by about a factor of two and increases the optical absorption by about a factor of three. Preheating the workpieces above 1300 K using the green focused annular beam utilizes both of these changes advantageously, reducing the near-infrared power required for melting and welding that is provided the focused center beam. This reduces the overall laser power applied to the workpieces and reduces the heat-affected zone. The infrared focused center beam also penetrates deeper into the workpieces, which further improves weld quality.

Spot welding and seam welding can be improved using the exemplary process and the inventive fiber laser. In spot welding, the green focused annular beam can be applied prior to the near-infrared focused center beam to preheat the workpiece. The focused annular beam can also be applied simultaneously with the focused center beam, to sustain an elevated temperature and thereby a stronger near-infrared absorption in the workpiece. Each beam can independently be ramped up or down in power, as needed, to optimize welding speed and quality.

In seam welding, a section of the green focused annular beam precedes the near-infrared focused center beam as the focused beams are scanned along an interface of the workpieces. This preceding section preheats the workpieces. An opposite section of the focused annular beam follows the focused center beam. This following section may prolong the melt phase during welding or anneal the welded workpieces, thereby improving weld quality. Again, the independent power control of each beam provided by the inventive fiber laser can be used to optimize welding speed and quality.

In summary, a fiber laser is disclosed that produces an output beam having a transverse mode comprising a center beam and a concentric annular beam. The output beam is delivered through an optical fiber having a center core and an annular core. A fundamental beam generated by a seed laser is amplified by a fiber amplifier and then partially converted into a harmonic beam by a harmonic generator. The unconverted fundamental beam and the harmonic beam are spatially separated by a dichroic mirror. The fundamental beam and the harmonic beam are selectively coupled into the center core and the annular core of the output optical fiber by a fiber combiner. Polarization modulators and polarizers are arranged to regulate the power in each core. Additional polarization modulators and polarizers can be arranged to control the relative power of the fundamental beam and the harmonic beam in each core of the output optical fiber. A polarization analyzer and a polarization modulator maintain the amplified fundamental beam in a preferred linear polarization and enable the harmonic beam to be scaled to kilowatts of power. The high-power output beam has an adjustable radial mode, with the center and annular beams having independently adjustable powers and wavelengths.

The present invention is described above in terms of a preferred embodiment and other embodiments. The invention is not limited, however, to the embodiments described and depicted herein. Rather, the invention is limited only by the claims appended hereto.

What is claimed is:

1. A fiber laser, comprising:
    a seed laser providing a laser beam having a fundamental wavelength;
    a fiber amplifier arranged to receive and amplify the fundamental beam, the amplified fundamental beam being linearly polarized;
    a harmonic generator arranged to receive the amplified fundamental beam and partially convert the amplified fundamental beam into a laser beam having a harmonic wavelength corresponding to a harmonic of the fundamental wavelength, the partial conversion leaving a residual laser beam having the fundamental wavelength;
    a dichroic mirror arranged to intercept and spatially separate the residual fundamental beam and the harmonic beam;
    a first polarization modulator and a first polarizer arranged to receive the residual fundamental beam and to regulate power by passing at least portion thereof;
    a second polarization modulator and a second polarizer arranged to receive the harmonic beam and to regulate power by passing at least a portion thereof;
    an output optical fiber having a center core and an annular core; and
    a fiber combiner arranged to receive the regulated fundamental beam and the regulated harmonic beam, the fiber combiner configured to couple at least a portion of the regulated fundamental beam into a first one of the cores of the output optical fiber and to couple at least a portion of the regulated harmonic beam into a second one of the cores of the output optical fiber.

2. The fiber laser of claim 1, wherein the regulated fundamental beam is coupled only into the center core and the regulated harmonic beam is coupled only into the annular core.

3. The fiber laser of claim 1, wherein the regulated harmonic beam is coupled only into the center core and the regulated fundamental beam is coupled only into the annular core.

4. The fiber laser of claim 1, wherein a complementary portion of the residual fundamental beam is coupled into the second core of the output optical fiber.

5. The fiber laser of claim 1, wherein a third polarization modulator and a third polarizer located between the first polarizer and the fiber combiner are arranged to regulate the power of a complementary portion of the residual fundamental beam that is coupled into the second core of the output optical fiber.

6. The fiber laser of claim 1, wherein a complementary portion of the harmonic beam is coupled into the first core of the output optical fiber.

7. The fiber laser of claim 1, wherein a third polarization modulator and a third polarizer located between the second polarizer and the fiber combiner are arranged to regulate the power of a complementary portion of the harmonic beam that is coupled into the first core of the output optical fiber.

8. The fiber laser of claim 1, wherein a third polarization modulator is located between the seed laser and the fiber amplifier, the third polarization modulator configured to establish and maintain the linear polarization of the amplified fundamental beam.

9. The fiber laser of claim 8, further including a partially-reflective mirror that directs a fraction of the amplified fundamental beam onto a third polarizer, the third polarizer passing a portion of the directed fundamental beam having a selected polarization onto a photodetector, the photodetector electrically connected to the third polarization modulator.

10. The fiber laser of claim 9, wherein an electrical signal from the photodetector is conditioned into an electrical control signal that regulates a change in polarization as the fundamental beam transits through the third polarization modulator.

11. The fiber laser of claim 9, further including a half-wave plate located between the partially-reflective mirror and the third polarizer.

12. The fiber laser of claim 8, further including a partially-reflective mirror having polarization-selective reflection that directs a fraction of the amplified fundamental beam onto a photodiode, the photodiode electrically connected to the third polarization modulator.

13. The fiber laser of claim 12, wherein an electrical signal from the photodetector is conditioned into an electrical control signal that regulates a change in polarization as the fundamental beam transits through the third polarization modulator.

14. The fiber laser of claim 1, wherein the harmonic beam is a second-harmonic beam and the harmonic wavelength is half the fundamental wavelength.

15. The fiber laser of claim 14, wherein the second-harmonic beam has greater than 1000 watts of power.

16. The fiber laser of claim 15, wherein the residual fundamental beam has greater than 1000 watts of power.

17. The fiber laser of claim 1, wherein the fundamental wavelength is about 1064 nanometers and the harmonic wavelength is about 532 nanometers.

18. The fiber laser of claim 1, wherein the harmonic generator includes a crystal made of lithium triborate (LBO) to partially convert the amplified fundamental beam into the harmonic beam.

19. A method of laser processing a workpiece by applying laser radiation delivered through an output optical fiber, the output optical fiber having a center core and an annular core, comprising the steps of:

generating a fundamental beam having a fundamental wavelength;

amplifying the fundamental beam, the amplified fundamental beam being linearly polarized;

converting a portion of the amplified fundamental beam into a harmonic beam having a wavelength corresponding to a harmonic of the fundamental wavelength, leaving a residual laser beam having the fundamental wavelength;

separating the residual fundamental beam and the harmonic beam;

coupling the residual fundamental beam into one of the cores of the output optical fiber;

coupling the harmonic beam into the other core of the output optical fiber; and regulating the power of the residual fundamental beam coupled into the output optical fiber and independently regulating the power of the harmonic beam coupled into the output optical fiber;

wherein the power of each beam is regulated by propagating the beam through a polarization modulator followed by a polarizer.

20. The laser processing method of claim 19, wherein the harmonic beam is a second-harmonic beam, the fundamental beam is coupled into the center core and the second-harmonic beam is coupled into the annular core.

* * * * *